(12) United States Patent
Cai

(10) Patent No.: US 7,751,855 B2
(45) Date of Patent: Jul. 6, 2010

(54) PRIVATE ROUTING CONTROL NUMBERS

(75) Inventor: Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1447 days.

(21) Appl. No.: 11/133,719

(22) Filed: May 20, 2005

(65) Prior Publication Data

US 2006/0281458 A1   Dec. 14, 2006

(51) Int. Cl.
    H04M 1/00   (2006.01)
(52) U.S. Cl. .............. 455/567; 455/410; 455/412.1; 455/417; 455/445; 455/415; 370/352
(58) Field of Classification Search ............ 455/461, 455/445, 417, 415; 379/211.01
    See application file for complete search history.

(56) References Cited

U.S. PATENT DOCUMENTS

| 5,315,636 | A | * | 5/1994 | Patel ..................... 379/201.07 |
| 5,329,578 | A | * | 7/1994 | Brennan et al. ........ 379/211.03 |
| 5,375,161 | A | * | 12/1994 | Fuller et al. ................ 455/417 |
| 5,442,680 | A | * | 8/1995 | Schellinger et al. ...... 455/426.1 |
| 5,742,905 | A | * | 4/1998 | Pepe et al. .................. 455/461 |
| 5,806,000 | A | * | 9/1998 | Vo et al. ...................... 455/466 |
| 5,966,428 | A | * | 10/1999 | Ortiz Perez et al. ....... 379/27.02 |
| 5,983,095 | A | * | 11/1999 | Cameron ..................... 455/417 |
| 6,011,975 | A | * | 1/2000 | Emery et al. ............. 455/456.1 |
| 6,097,801 | A | * | 8/2000 | Williams et al. ........ 379/221.13 |
| 6,097,968 | A | * | 8/2000 | Bannister et al. ............ 455/561 |
| 6,181,935 | B1 | * | 1/2001 | Gossman et al. ............ 455/433 |
| 6,263,064 | B1 | * | 7/2001 | O'Neal et al. ........... 379/201.03 |
| 6,389,117 | B1 | * | 5/2002 | Gross et al. ............... 379/88.23 |
| 6,574,470 | B1 | * | 6/2003 | Chow et al. .................. 455/417 |
| 6,614,781 | B1 | * | 9/2003 | Elliott et al. ................. 370/352 |
| 6,671,523 | B1 |   | 12/2003 | Niepal et al. |
| 7,023,979 | B1 | * | 4/2006 | Wu et al. ............... 379/265.11 |
| 7,024,184 | B2 | * | 4/2006 | Erb et al. ..................... 455/417 |
| 7,373,181 | B2 | * | 5/2008 | Vogedes et al. ............. 455/567 |
| 7,454,195 | B2 | * | 11/2008 | Lewis et al. .............. 455/412.1 |
| 7,555,110 | B2 | * | 6/2009 | Dolan et al. ........... 379/211.02 |
| 7,564,840 | B2 | * | 7/2009 | Elliott et al. ................. 370/356 |
| 7,564,960 | B2 | * | 7/2009 | Urban et al. ........... 379/142.01 |
| 2005/0008135 | A1 | * | 1/2005 | Bressler ................. 379/211.01 |
| 2007/0005702 | A1 | * | 1/2007 | Tokuda et al. ............... 709/206 |

FOREIGN PATENT DOCUMENTS

| WO | WO98/31163 | 7/1998 |
| WO | WO 98/42115 | 9/1998 |
| WO | WO 00/39988 | 7/2000 |

OTHER PUBLICATIONS

3GPP TS 23,228 V6. 9.0 (Mar. 2005) 3rd Gen. Partnership Project; Tech. Specs Group Services; IMS; Stage 2 Released.

* cited by examiner

*Primary Examiner*—Sharad Rampuria
(74) *Attorney, Agent, or Firm*—Werner Ulrich, Esq.

(57) ABSTRACT

A method and apparatus for permitting different treatment of calls from different callers. Favored callers who receive preferred treatment, the preferred treatment including the ability to complete calls, are provided with a private number. If the callers use the private number, they are subject to an incoming class of service to the called party that is substituted for the class of service provided to callers who use the public telephone number of the called station. Advantageously, at the discretion of the called party different callers may be provided with different private numbers and their calls may be blocked or completed with special alerting tones.

9 Claims, 3 Drawing Sheets

PRIVATE ROUTING CONTROL NUMBERS

TECHNICAL FIELD

This invention relates arrangements for selectively blocking telephone calls or data communications through the use of private routing numbers.

BACKGROUND OF THE INVENTION

Spam is a general term for unwanted data or voice messages delivered through a telecommunications network. Spam is a particular problem in short message service and e-mail. For example, spam short messages account for an estimated three quarters of a yearly total of five trillion short message service (SMS) messages worldwide. The prevalence of spam and the relative ease of transmitting spam at low cost have created a near crisis in short message service because spam uses so much of the telecommunications resources of SMS.

Spammers usually send spam messages to mobile end users by mobile telephone numbers either in a fixed range or randomly selected. For example, Spammers in China generate mass spam messages from a personal computer and send these to the public using telephone numbers with the last four digits in the range 0000 to 9999. Some spammers send spam messages to particular groups of end users, for example, when end users subscribe to a new service by intercepting the telephone numbers of the new end user subscribers.

There have been many mechanisms and applications developed for screening and blocking spammer messages, either at the network or at the SMS center (SMSC). However, even with current advanced technologies an estimated 10% of spam messages can go through the anti-spam filtering and reach the end users. Considering the huge number of spam messages being generated today, even receiving a small percentage of spam messages will still cause dissatisfaction to end users and waste large amount of SMS resources.

SUMMARY OF THE INVENTION

The above problem is substantially alleviated, especially for receiving customers who wish to be protected against the reception of a large number of spam messages, in accordance with this invention wherein the telecommunications terminal identified by a telephone number, such as an E.164 number, is permitted to associate with that number a private identification such as a private set of alphanumeric characters or a private number with special routing attributes. The routing attribute of the main number can either be "block all calls" or "complete only voice calls". Advantageously, only the callers who know the private number can have their calls or their non-voice calls completed.

In accordance with one preferred embodiment of the invention, the private numbers are arbitrary numbers, for example, resembling an e-mail address. Advantageously, this arrangement provides for the availability of private numbers without using the much more limited number of telephone numbers.

In accordance with another feature of Applicant's invention, the end user terminal can provide a private number which is checked for legitimacy (uniqueness) and can assign to each private number a routing strategy such as completion of voice calls but not SMS calls; or completion only of SMS calls; or completion only of e-mail calls; or completion of voice calls only; or forwarding of voice calls on busy. The public number can then be used for simple completion of voice calls. Advantageously, an end user can have several different private numbers and can selectively distribute different ones of these private numbers to different callers.

In accordance with one feature of Applicant's preferred embodiment, the end user can change private numbers or change the routing strategies for existing private numbers associated with his/her basic telephone number. This can be done in a number of ways:

(1) A subscriber can login a service provider's website via the Internet with a user ID (can be the basic telephone number) and a password. The website then provides menu selection to add new and modify existing private number(s); (2) A subscriber can dial a 1-800 number to an interactive voice response (IVR) system to add/modify private numbers with user ID and password accessing. The service provider will have menu access to direct the provisioning of private numbers; (3) Mobile phone access (with password or PIN). The subscriber can dial a special number or URL to access the database to add/modify private numbers; (4) The mobile subscriber can send an SMS to a special destination to add/modify private numbers (no password, since the mobile number is enough).

In accordance with one preferred embodiment of Applicant's invention, the telecommunications network used to carry the communications is a mobile network and the home location register (HLR) of that network is used to store the translation from the private number to the telephone number of the terminal having that private number. If the HLR does not contain the private number then the HLR queries its associated short message service center SMSC. More specifically one of the following options is available: (1) The basic telephone number and private numbers mapping tables can be stored in the MSC, or HLR which is a subscriber database for a location and routing address; (2) The SMSC has its own database for subscriber and services. It is important that SMSC checks if SMS message should be rejected if only the subscriber provisioned particular private number is allowed for SMS service. This is an anti-SPAM feature. (3) The mapping table in both the MSC and HLR can be used for routing purposes. If the MSC cannot find the translation in its local database, it queries HLR for the translation. In the prior art, the MSC has the mobile number but does not know where to route the call; it queries the HLR for a routing address wherein the mobile subscriber registered at the HLR with the most current location information. But in this application, there are two possibilities (a) the MSC has translated the private number to a basic number but does know the routing address; it queries the HLR for a routing address by providing the basic number and the HLR returns the routing address; (b) if the MSC cannot find a translation of the private number, it queries the HLR for both translation and routing address and the HLR responds with both the number and routing address. (4) For a voice call, the MSC will route the call to a destination network once the routing address is available; for an SMS call, the MSC will route the call to an SMSC first if it is a MO (Mobile Originating) SMS. The SMSC processes the SMS call and routes the call to MSC again which delivers the call to a destination SMSC (the SMSC will queries to HLR if it does not know the B party routing address) to obtain a translation.

If a translation is still not available, a broader network-wide database is queried. The translation will provide the telephone number (so that calls may be completed in the conventional way using the existing telecommunications network infrastructure) and the routing privileges (e.g., SMS terminating, voice terminating, e-mail terminating) associated with that private number.

Advantageously, with this type of arrangement, a telecommunications terminal user has great flexibility in controlling unwanted incoming traffic.

BRIEF DESCRIPTION OF THE DRAWING(S)

DETAILED DESCRIPTION

Figure 1:
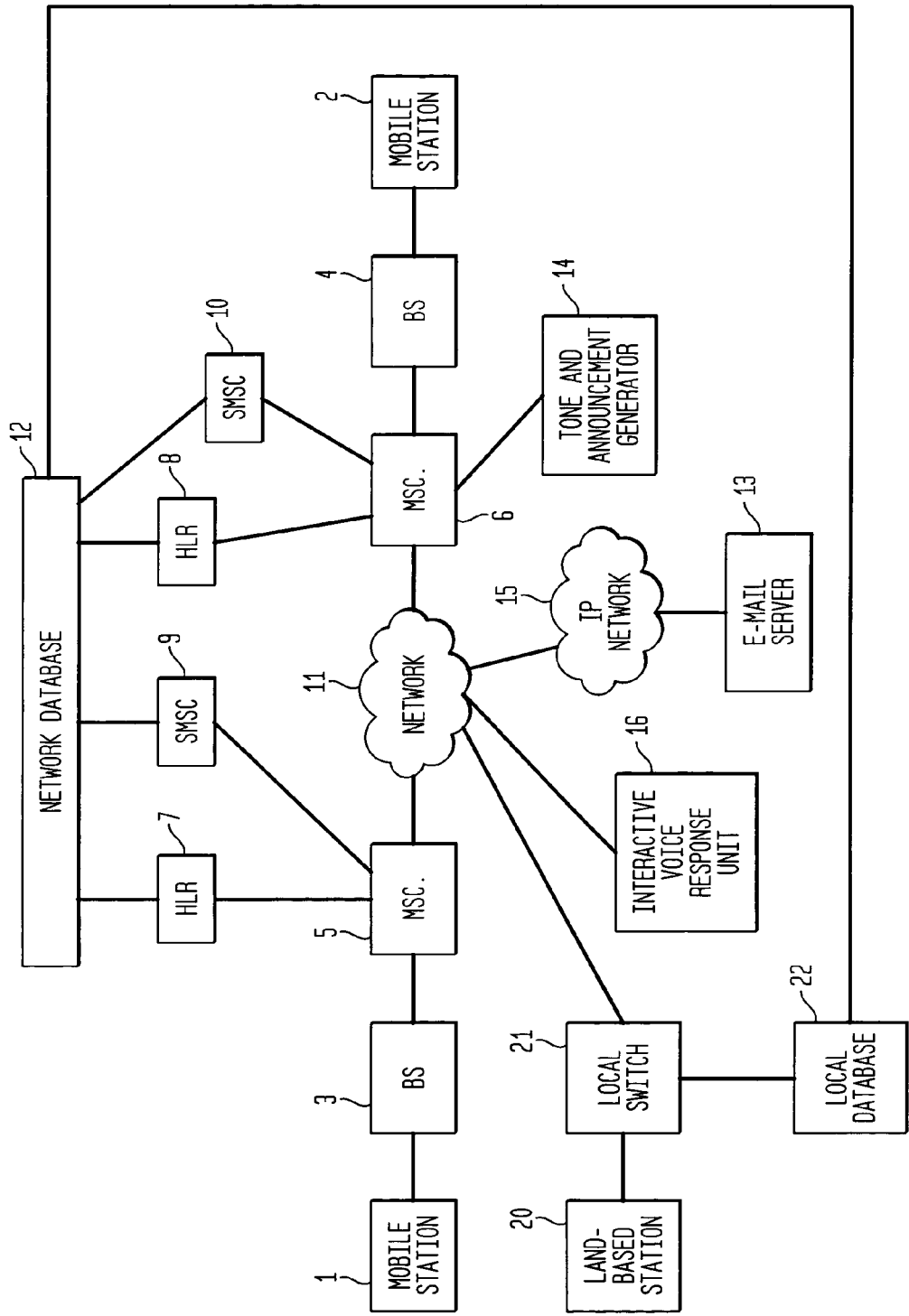
FIG. 1 is a block diagram illustrating the operation of Applicant's invention.

FIG. 1 is a block diagram illustrating the operation of Applicant's invention. It shows two terminals 1 and 2. In the illustrated example, terminal 2 calls terminal 1 and terminal 1 has populated the database for determining the treatment of private identifications such as private numbers associated with mobile station 1. Mobile stations 1 and 2 communicate through base stations 3 and 4 with mobile switching centers 5 and 6. Mobile switching centers are interconnected by network 11. Mobile switching center 5 receives data from home location register (HLR) 7 and also communicates with short message service center (SMSC) 9. For the MT (Mobile Terminating) case, the Terminating SMSC receives SMS messages from the terminating MSC which queries the HLR for a routing address of the called party. The SMSC processes SMS message (including filtering) and directs the terminating MSC to deliver SMS to the called party. In this application, the terminating SMSC will decide whether it should deliver the SMS based on a private number and class of services. When the originating MSC delivers signaling to a terminating MSC, it may include both the basic number and the private number in the signaling. Similarly, mobile switching center 6 communicates with HLR 8 and SMSC 10. HLR 7, HLR 8, SMSC 9, and SMSC 10 all communicate with a network database 12 to obtain information which is required for serving a call but which is not found in the HLR or the SMSC.

Also connected to network 11 is e-mail server 13 connected to the IP network 15. A mobile station can send e-mail to the e-mail server which directs the e-mail to a destination e-mail server via the IP network. The destination e-mail server will then deliver the e-mail to the receiver. If mobile station 2 wishes to send an e-mail to mobile station 1, the call is initially routed to MSC 5 which by checking in its HLR record the private or public name supplied by mobile station 2 routes the call from mobile station 2 to an e-mail server 13 along with an indication of the class of service to be provided, for example, whether the message is to be accepted, or whether the message is to be flagged as a high priority message. The MSC will query the HLR to get the IP address of the e-mail server, and will route the message over the IP network to that server. The MSC and HLR database with provisioned private number and class of services can determine whether the email shall be delivered or rejected. The terminating e-mail server will deliver the e-mail to the receiver. The receiver can access the e-mail from any kind of devices including mobile station 1.

A land-based station 20, connected to a local switch 21 can also use the principles of this invention. The local switch 21 has access to a local database 22 for interpreting private routing control numbers. The local database can also access network database 12 in case a dialed private routing control number is not in the local database. Calls are routed from local switch 21 via network 11 in essentially the same way as calls from a mobile switching center.

A tone and announcement generator 14 is used to send tones and announcements to a destination terminal. The tones or announcements can be used to provide an identifying signal or message to a destination station.

When making changes in the private routing control number database, an interactive voice response unit 16, attached to network 11, can be used for the dialog between the station making changes and the private routing control number database.

Figure 2:
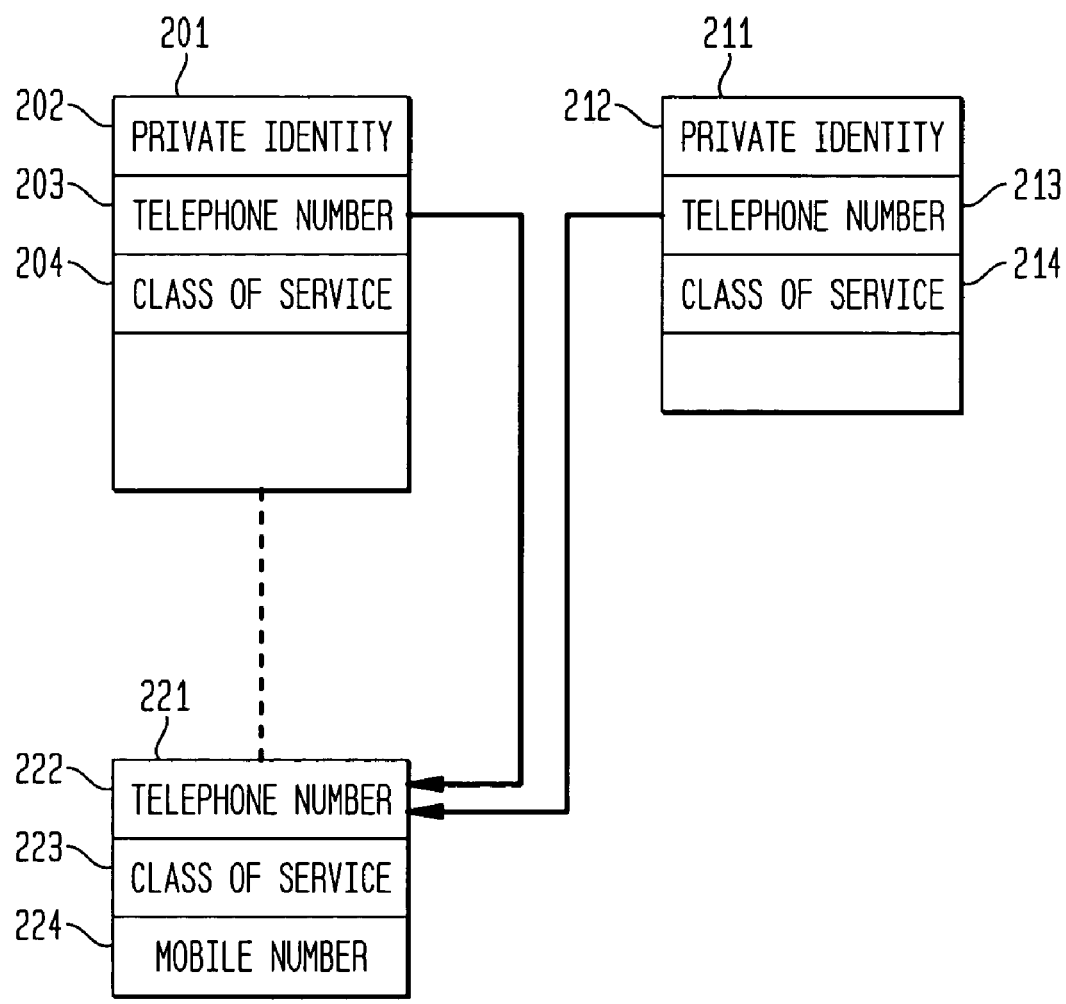
FIG. 2 is a diagram showing elements of the database for implementing Applicant's invention.

FIG. 2 is a diagram showing the database relationships among the database entries for the private numbers and the public telephone number. For each private number, such as private number 202 in block 201, there is recorded the public telephone number 203 that corresponds to this private number. Also recorded is the class of service to be provided to the caller if the caller is using the private number of block 201. The class of service is stored in area 204 of block 201. The telephone number 203 provided in block 201 is a link to an entry for the public telephone number of the called mobile station. Stored in block 221 is this telephone number 222, the class of service for that telephone number 223, and, optionally, the mobile identification number. The class of service 204 is substituted for the class of service 223 if the private number 202 is used instead of the telephone number 222 of the called mobile station.

Block 211 illustrates data stored for a private number. The data includes the private number 212, the basic (public) telephone number 213, and the class of service 214. The basic telephone number 213 includes a pointer to block 221.

Figure 3:
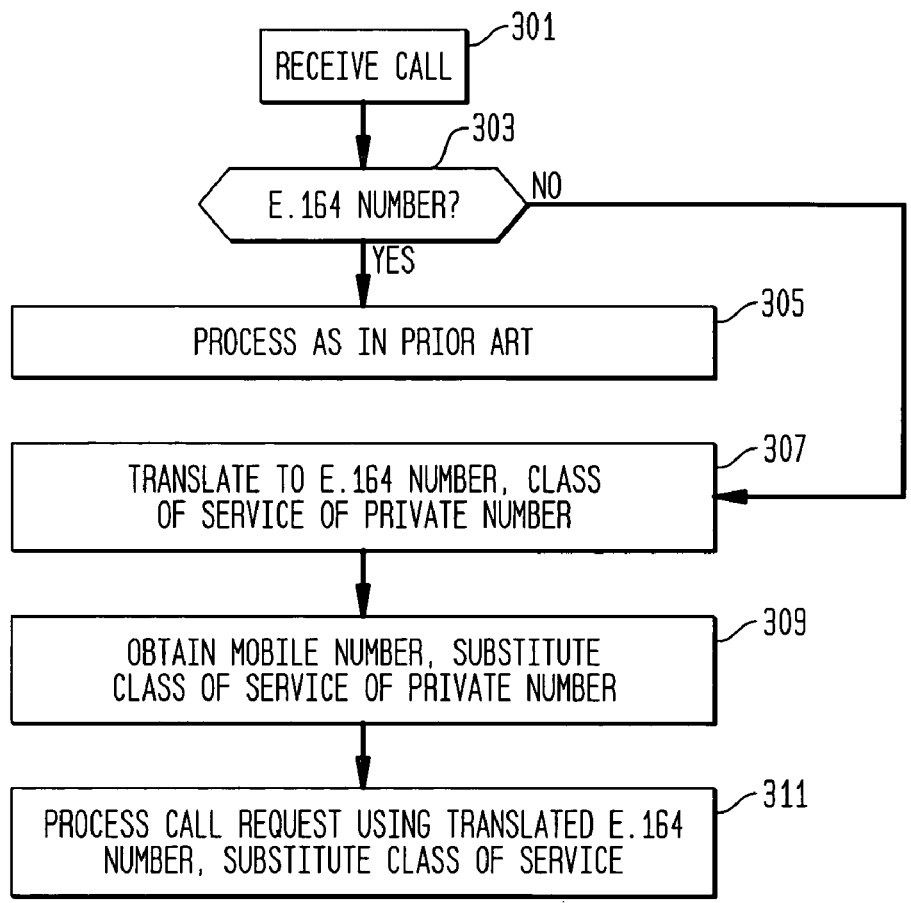
FIG. 3 is a flow diagram showing the operation of Applicant's invention.

FIG. 3 is a flow diagram illustrating the operation of Applicant's invention. A call is received in a serving mobile switching center such as MSC 6 (action block 301). Test 303 determines whether the called number provided by the caller is an E.164 number, i.e., a conventional telephone number. If the result of test 303 is positive, then the call is processed as in the prior art (action block 305). If the called number provided by the caller is not an E.164 number, then the number provided by the caller is translated to an E.164 number and the class of service for the private number called by the caller is provided. The E.164 number is used to obtain the mobile identification number and if an E.164 number was not originally dialed, the class of service associated with the private number is substituted for the class of service of the E.164 number (action block 309). The call is then processed using the E.164 number but also using the substituted class of service obtained in step 307 (action block 311).

Figure 4:
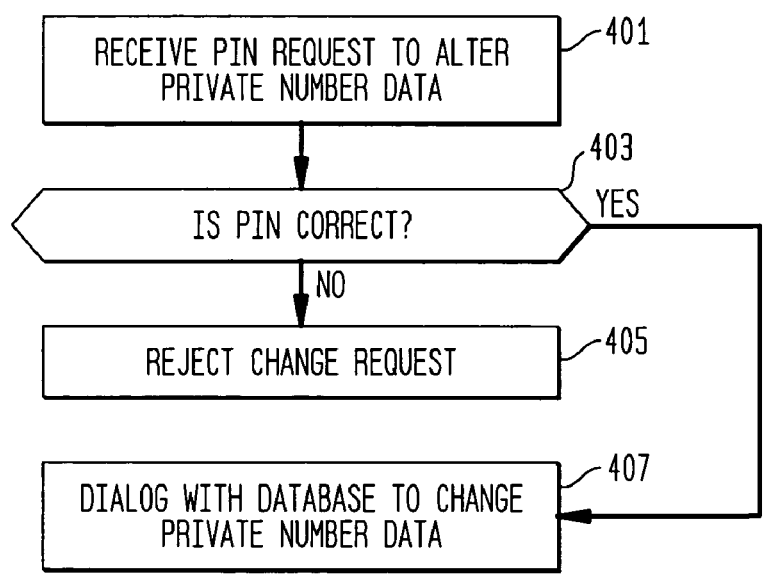
FIG. 4 is a flow diagram illustrating the process of changing the database of Applicant's invention.

FIG. 4 illustrates the process of updating the private number database. A network management system receives a request to alter the private number data and receives the PIN associated with the party requesting the alteration. This can be done in one of 4 ways: (1) A subscriber can login a service provider's website via the Internet with a user ID (can be the basic telephone number) and a password. The website then provides menu selection to add new and modify existing private number(s); (2) A subscriber can dial a 1-800 number to an interactive vice response (IVR) system to add/modify private numbers with user ID and password accessing. The service provider will have menu access to direct the provisioning of private numbers; (3) Mobile phone access (with password or PIN). The subscriber can dial a special number or URL to access the database to add/modify private numbers. (4) The mobile subscriber can send an SMS to a special destination to add/modify private numbers (no password, since the mobile number is enough).

Test 403 is used to determine if the PIN is correct for the mobile station that is making the request. If not, the change request is rejected (action block 405). If the PIN is correct, then a dialogue between the database and the mobile station ensues in order to change the private number data, either to change the private number or to change the class of service of that private number or both. If the private number is being changed, the new private number is checked to make sure it doesn't conflict with an existing private number.

If the calling device is a telephone station and not a personal computer, then the private number is indicated by a prefix, such as ***, and followed by a numerical private number.

Each private number can be mapped to a different distinguishing alerting tone which will be played to the called party so that the called party is put on notice who is calling. The MSC will map a private number to a distinguishing tone ID from the mapping table and send a Tone ID to Intelligent Peripheral (IP) device to play the tone to the called party.

A private number can indicate a requested call forwarding. For example, private number A is forwarded to home phone number, private number B is forwarded to office number, private number C is forwarded to voice mail.

The above description is of one preferred embodiment of Applicant's invention. Other embodiments will be apparent to those of ordinary skill in the art without departing from the scope of the invention. The invention is limited only by the attached claims.

I claim:

1. A method of providing differentiated incoming service to callers of a mobile station, comprising the steps of:
   providing a private identification of said mobile station to callers who are to receive differentiated incoming service to said mobile station said private identification different from a main telephone number of said mobile station;
   populating a database with said private identification and with a class of service for incoming calls to said mobile station identified said private identification;
   responsive to receipt of an incoming call to said mobile station identified by said private identification, substituting said stored class of service for the class of incoming service provided to callers who call a main telephone number of said mobile station, wherein the step of providing a private identification comprises the step of providing a private identification that is not an E.164 number.

2. The method of claim 1 wherein said private identification is readily differentiable from a main telephone number of any mobile station.

3. The method of claim 1 wherein said mobile station can transmit messages to request an alteration of contents of said database.

4. The method of claim 3 wherein a user of said mobile station provides a personal identification number (PIN) to permit a change of said database entry; and
   wherein unauthorized users who do not know said PIN are prevented from changing said database contents.

5. The method of claim 1 wherein calls from callers using said private identification use a special alerting (ringing) tone.

6. The method of claim 1 wherein the database is part of a telecommunications network for serving said mobile station.

7. The method of claim 1 wherein said stored class of service requests a routing of said incoming call that is different from a routing of a call if said main number is called.

8. The method of claim 1 wherein said private identification comprises a header, different from a header of a mobile telephone number, and a group of numerical characters, wherein said private identification can be keyed from a plain old telephone service (POTS) telephone station.

9. A method of providing differentiated incoming service to callers of a land based telephone station, comprising the steps of:
   providing a private identification of said land based telephone station to callers who are to receive differentiated incoming service to said land based telephone station:
   said private identification different from a main telephone number of said land based telephone station;
   populating a database with said private identification and with a class of service for incoming calls to said land based telephone station identified by said private identification;
   responsive to receipt of an incoming call to said land based telephone station identified by said private identification, substituting said stored class of service for the class of incoming service provided to callers who call a main number of said land based telephone station,
   wherein the step of providing a private identification comprises the step of providing a private identification that is not an E.164 number.

* * * * *